(12) United States Patent
Callery et al.

(10) Patent No.: US 8,396,869 B2
(45) Date of Patent: Mar. 12, 2013

(54) METHOD AND SYSTEM FOR ANALYZING CAPABILITIES OF AN ENTITY

(75) Inventors: Matthew J. Callery, Shrub Oak, NY (US); Robert D. Dill, Raleigh, NC (US); Lauretta Jones, Purdys, NY (US); Daniel Oppenheim, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 11/969,347

(22) Filed: Jan. 4, 2008

(65) Prior Publication Data
US 2009/0177665 A1 Jul. 9, 2009

(51) Int. Cl.
G06F 7/00 (2006.01)
G06F 17/30 (2006.01)

(52) U.S. Cl. ...................................................... 707/733

(58) Field of Classification Search .................. 707/634, 707/694, 708, 722, 732, 769, 771, 778, 786, 707/797, 799, 805, 829, 999.001–999.01, 707/999.1, 999.101–999.107, 999.2–999.206, 707/1, 6, 100, E17.009; 705/26–27, 9, 301, 705/348, 14.66, 410

See application file for complete search history.

(56) References Cited

U.S. PATENT DOCUMENTS

| | | | |
|---|---|---|---|
| 6,629,081 B1 * | 9/2003 | Cornelius et al. | 705/30 |
| 7,162,427 B1 * | 1/2007 | Myrick et al. | 705/348 |
| 2002/0123812 A1 * | 9/2002 | Jayaram et al. | 700/98 |
| 2003/0018510 A1 * | 1/2003 | Sanches | 705/9 |
| 2003/0115090 A1 * | 6/2003 | Mujtaba et al. | 705/8 |
| 2004/0098392 A1 * | 5/2004 | Dill | 707/100 |
| 2004/0225629 A1 * | 11/2004 | Eder | 706/46 |
| 2007/0150293 A1 * | 6/2007 | Dagnino | 705/1 |
| 2007/0203718 A1 * | 8/2007 | Merrifield, Jr. | 705/1 |
| 2007/0299708 A1 * | 12/2007 | Ouderkirk et al. | 705/8 |

* cited by examiner

*Primary Examiner* — Khanh Pham
*Assistant Examiner* — Reza Hosseini
(74) *Attorney, Agent, or Firm* — Vazken Alexanian; McGinn IP Law Group, PLLC

(57) ABSTRACT

A method and system for analyzing capabilities of an entity includes inputting data regarding an entity's capabilities, and using a capability model to detect a capability pattern among the capabilities and generate an action plan based on the capability pattern.

32 Claims, 14 Drawing Sheets

FIG. 4

Selling the Architecture

Components: Corporate Level Review Team, Technology Leader, Communications, Management The SA roles and processes are Communications and Management, and Steering Committee and CTO. Of course, selling the architecture depends on having something to sell, e.g. it depends on having an architecture worth bragging about. Communications represents all facets of both providing and gathering information about the architecture. A web site, while an important tool in this process is not the whole process. It includes making information available, gathering feedback, enabling customers to start and prosper, etc. The Management process is where all the management information related to architecture comes together. The CTO is the redundant one of the architecture and the Steering Committee is political too.

Sample Client: *median (1)*     *Hero*
Fictious Company: *median (2)*     *Respectable*

Strong Corporate Level Review Team, Weak Technology Leader/CTO

Components: Corporate Level Review Team, Technology Leader

Strong support for architecture. Support from business community to what they want and the CTO culture group without detractors. Expert team to lead commission and management integration, tool for architects to advance in the decades and the Expert log matters of concern. The architecture will have to win business over and the decisions. Expert high-powered team sessions with top stakeholders. Support team will be held and responses represent the complex Expert IT is no trust that new is not integrated and support unit associated with responses.

Fictious Company: *median (2)*

Weak Corporate Level Review Team, Weak Technology Leader/CTO

Components: Corporate Level Review Team, Technology Leader

Only of any architecture buy-in can be to patient and technical visas are short, level architecture in this position in the quickly down to either the current or most publicity position. Such a redundancy for buy-in. The architect can be outlined to your approach by setting commission and management processes, not getting their process escalated in the face of these tendencies will request CTO and other Client leadership.

Sample Client: *median (1.5)*

FIG. 9

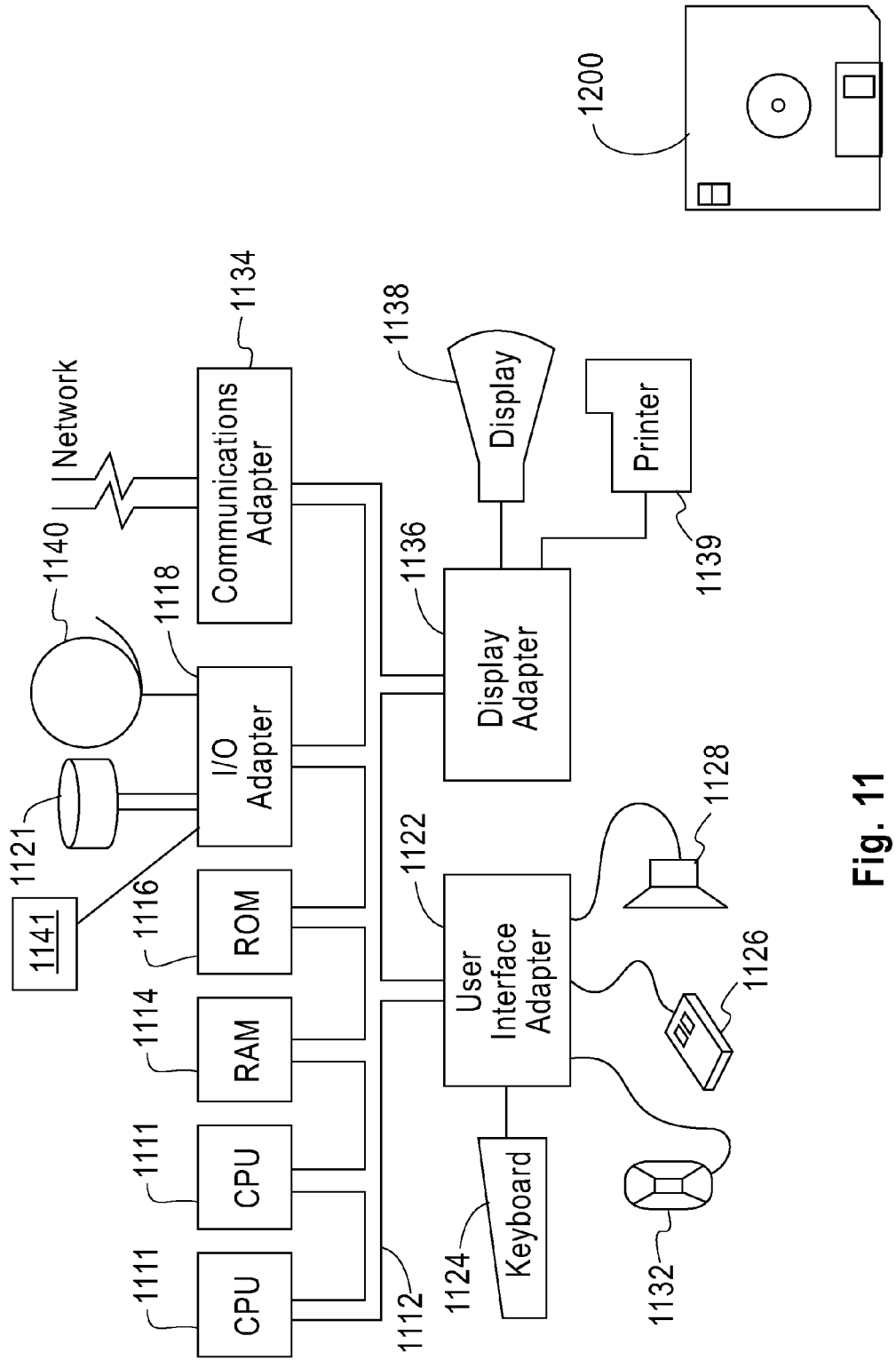

METHOD AND SYSTEM FOR ANALYZING CAPABILITIES OF AN ENTITY

BACKGROUND OF THE INVENTION

1. Field of the Invention

The present invention relates to a method and a system for analyzing capabilities of an entity and more particularly, a method for analyzing capabilities which may detect a capability pattern among the entity's capabilities.

2. Description of the Related Art

A capability model is generally understood to be a framework designed to evaluate an entity's ability to perform a particular overall function, where an entity is comprised of one or more individuals or organizations. The results of such an evaluation are typically represented as a single overall value and an associated description of the ability level which the value represents. These evaluation results are commonly used to create an action plan which may include a set of actions that the entity may take to help achieve a specific goal.

Capability models are conventionally used in many areas including, for example, business, technology and the military. Capability models are used, for example, to analyze the capabilities of business entities, technological entities, and individuals. Capability models may be used, for example, in software development (e.g., enterprise architecture development), individual career evaluation, professional development, etc.

For example, a business entity may use a capability model to analyze the capabilities of its departments to determine which department is best suited to handle a particular task, or to determine what action a particular department should take in order to improve that department's capabilities for that particular task. As another example, an entity such as the military may use a capability model to analyze the capabilities of its individuals to determine which person is best suited to handle a particular task.

Conventional capability models can be considered to include the following five features:

1. The model works on a closed set of capabilities;

2. Each capability in the set has an associated definition, a description and a closed set of possible responses. The responses may be normalized to a common numeric range;

3. The model may group capabilities by a categorization scheme (e.g., capabilities relating to organization are grouped separately from those relating to process; capabilities related to conceptual thinking are grouped separately from those related to management of details); Such groups (e.g., categories) of capabilities may in turn be incorporated into a larger group (e.g., hierarchically grouped). Irrespective of whether the capabilities are so hierarchically grouped, individual capabilities do not belong to multiple groups.

That is, there may be a hierarchical relationship between capabilities but not a horizontal relationship. That is, the model may include a parent-child relationship between capabilities, but not a peer-peer relationship between capabilities. Thus, capabilities can be considered as belonging to multiple groups (e.g., in a parent-child relationship, a single-inheritance relationship, or a pure subset relationship), but the capabilities could not span these groups such that they belong to categories outside of their direct hierarchy.

4. Evaluation results: As currently used, capability models combine an entity's responses to individual capabilities into single values at the category level and/or into an overall value. Thus, conventional capability models allow an entity to be represented and compared to other entities or to meaningful norms based on summarized values. However, these capability models DO NOT allow an entity to be compared to other entities on the individual capability level nor on any cross-hierarchical grouping (e.g., pattern) of capabilities.

5. Action Plan: An action plan may contain the current single evaluation value and a target value and may also include a set of actions that enable the entity to make changes in their capabilities in order to achieve a desired result, i.e., move closer to the target value.

However, the current state of the art of capability models has several limitations. For example, by providing a single, normalized or averaged evaluation value, the specificity and potential customization of an action plan for any particular entity is constrained. The current methods do not provide techniques which consistently use responses to individual capabilities nor do they use information which may be derived from an analysis of groupings of capabilities to provide customized action plans.

Instead, this is left to the skill and experience of the assessor. Hence current methods are limited in the specificity and customization that they can provide in an action plan, outside the skill of the assessor.

In addition, much important information is masked when a single evaluation value is calculated and provided to the entity being evaluated. For example, in the case of two entities completing the same capability model, it is possible for the entities to provide different responses to individual capabilities and yet obtain identical evaluation values and action plans.

Customization of an action plan is needed in order to have a reasonable chance of success in obtaining a target objective. Creating a customized action plan requires information other than a single evaluation value. For instance, a customized action plan needs to represent not only the current and target evaluation values and a list of actions, but should also schedule actions and changes based on the highest priority needs of the entity.

In addition, differences in particular responses to individual capabilities or patterns of capabilities may require a different action plan. This information is identifiable within the details of the capability evaluation but requires application of significant subject matter expertise.

Thus, there are at least two undesirable outcomes of the limitations inherent in current methods of analyzing capabilities of entities:

1. A dependence on subject matter expertise to create customized action plans means that individuals with differing levels of knowledge and experience who review the same capability evaluation will likely generate different plans; and 2. A generic and common action plan will be offered to entities with a similar overall evaluation value without regard to significant variations in their underlying capabilities.

SUMMARY OF THE INVENTION

In view of the foregoing and other exemplary problems, drawbacks, and disadvantages of the conventional methods and structures, a purpose of the exemplary aspects of the present invention is to provide a method and system for analyzing the capabilities of an entity which may detect whether a capability pattern exists based on the entity's capabilities.

An exemplary aspect of the present invention is directed to a method of analyzing capabilities of an entity. The method includes inputting data regarding an entity's capabilities, and using a capability model to detect a capability pattern among the capabilities and generate an action plan based on the capability pattern. The capability model may assign plural levels to a capability, assign a numerical value to the plural levels, and associate a description with the numerical value.

The capability pattern (e.g., a plurality of capability patterns) may be associated with a plurality of the capabilities. Further, the capability model may group capabilities into plural functional areas which include a nonexclusive grouping of the capabilities, and plural domains which include an exclusive grouping of the capabilities. The plural functional areas may also include nested hierarchies of functional areas.

Further, the capability pattern may include a rule which indicates how to detect when the capability pattern exists, a symptom which describes an expected behavior resulting from the capability pattern, and a prescription which describes a suggested action to overcome the symptom. For example, the rule of the capability pattern may be expressed in terms of the value of a single capability, or an existence of a capability pattern, or an existence of a capability pattern and an absence of a capability pattern. The rule of the capability pattern may also be expressed in terms of a relationship between values of the capabilities, a relationship between a value of a capability and an existence of a capability pattern, and a relationship between a value of a capability and an absence of a capability pattern.

The method may also include identifying a combination of capability patterns in the plurality of capability patterns, associating with the combination a symptom that is typical of the combination. Further, the action plan may be used to resolving the symptom. The action plan may include a description of the symptom, and an ordered set of the functional areas to be addressed for resolving the symptom. An order of the ordered set of functional areas may be based on a dependency between the functional areas.

The method may also include using a result of applying the action plan to a capability model to generate a new action plan. Further, the symptom may include a plurality of symptoms. In this case, the method may further include selecting a symptom from the plurality of symptoms, and prioritizing the plurality of symptoms. Further, the symptom may be associated with a combination of capability patterns having a high correlation with known positive or negative effects.

The method may also include deploying computing infrastructure in which computer-readable code is integrated into a computing system, such that said code and said computing system combine to perform said inputting data regarding an entity's capabilities, and using a capability model to detect a capability pattern among the capabilities and generate an action plan based on the capability pattern.

Another exemplary aspect of the present invention is directed to a system for analyzing capabilities. The system includes an input device for inputting data regarding an entity's capabilities, and a capability model for detecting a capability pattern among the capabilities and generating an action plan based on the capability pattern.

Another exemplary aspect of the present invention is directed to a programmable storage medium tangibly embodying a program of machine-readable instructions executable by a digital processing apparatus to perform the method of analyzing capabilities of an entity according to the present invention.

With its unique and novel features, the present invention provides a method and system for analyzing capabilities which may detect a capability pattern among the entity's capabilities. This may help to allow the present invention generate a helpful customized action plan for solving problems that may be experienced by the entity.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 illustrates an individual capability level screen 400 which may be generated, according to an exemplary aspect of the present invention;

FIG. 9 illustrates a screen 900 for depicting an application of functional areas and patterns, which may be generated according to an exemplary aspect of the present invention;

FIG. 11 illustrates a typical hardware configuration which may be used for implementing the system and method according to the exemplary aspects of the present invention;

FIG. 12 illustrates a programmable storage medium 1200 tangibly embodying a program of machine-readable instructions executable by a digital processing apparatus to perform the method according to the exemplary aspects of the present invention;

DETAILED DESCRIPTION OF EXEMPLARY EMBODIMENTS OF THE INVENTION

Figure 1:
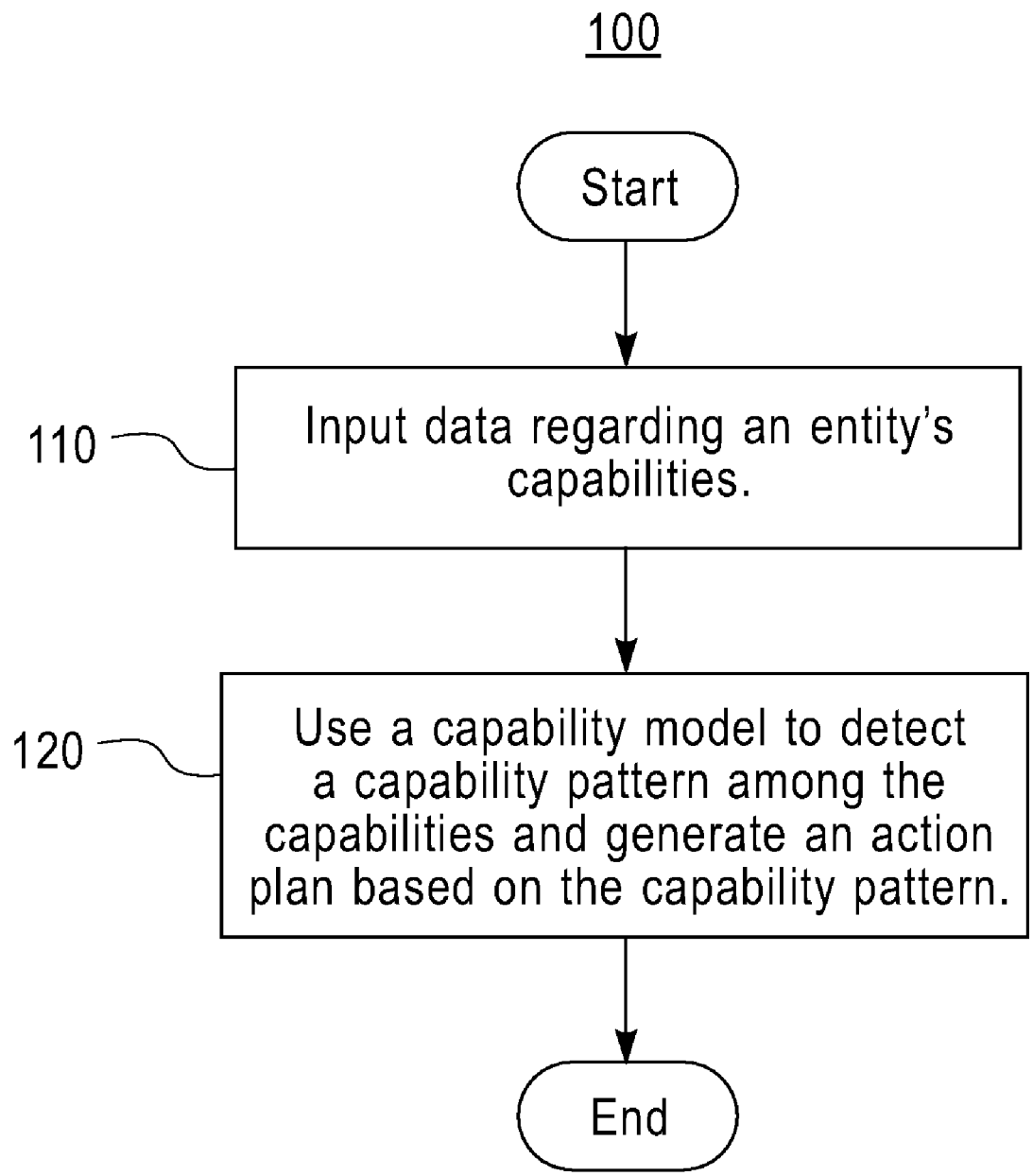
FIG. 1 illustrates a method 100 of analyzing capabilities of an entity, according to an exemplary aspect of the present invention.

Referring now to the drawings, and more particularly to FIGS. 1-12, there are shown exemplary embodiments of the method and structures of the present invention.

The present invention may resolve many of the fundamental problems in conventional methods for evaluating an entity's capabilities. In particular, in the present invention 1) Results do not vary based on the skill and knowledge of the individual performing the evaluation; 2) Critical information is not lost such as by summarizing the capability evaluation and expressing that evaluation as a single overall number, or summarizing capabilities within a group and expressing the result as a single group value as in the conventional methods; 4) The present invention may effectively and consistently identify the importance of the evaluated capabilities when reviewing an evaluation at more detailed levels; and 5) The dependencies and interactions between capabilities at both the overall and group level are not masked and may be, therefore, readily detected. This is especially true of capability interactions that cross group boundaries.

The present invention may leverage the concept of hierarchy (as used in conventional capability models) when defining capabilities. An important aspect of the present invention is that, even though a capability may exist at a single point in a hierarchy for purposes of displaying a survey or gathering data, the capability is able to participate in many peer relationships during an analysis phase.

Further, unlike conventional methods, the present invention may allow an entity to be compared to other entities on the individual capability level and/or on a cross-hierarchical grouping (e.g., pattern) of capabilities. The present invention may also provide techniques which consistently use responses to individual capabilities and may also use information which may be derived from an analysis of groupings of capabilities to provide a customized action plan. Therefore, unlike with conventional methods, in the present invention such analysis is not necessarily left to the skill and experience of an individual who is assessing the results generated by a capability model.

FIG. 1 illustrates a method 100 of analyzing capabilities of an entity according to an exemplary aspect of the present invention. As illustrated in FIG. 1, the method 100 includes inputting (110) data regarding an entity's capabilities, using (120) a capability model to detect a capability pattern among the capabilities and generate an action plan based on the capability pattern.

Figure 2:
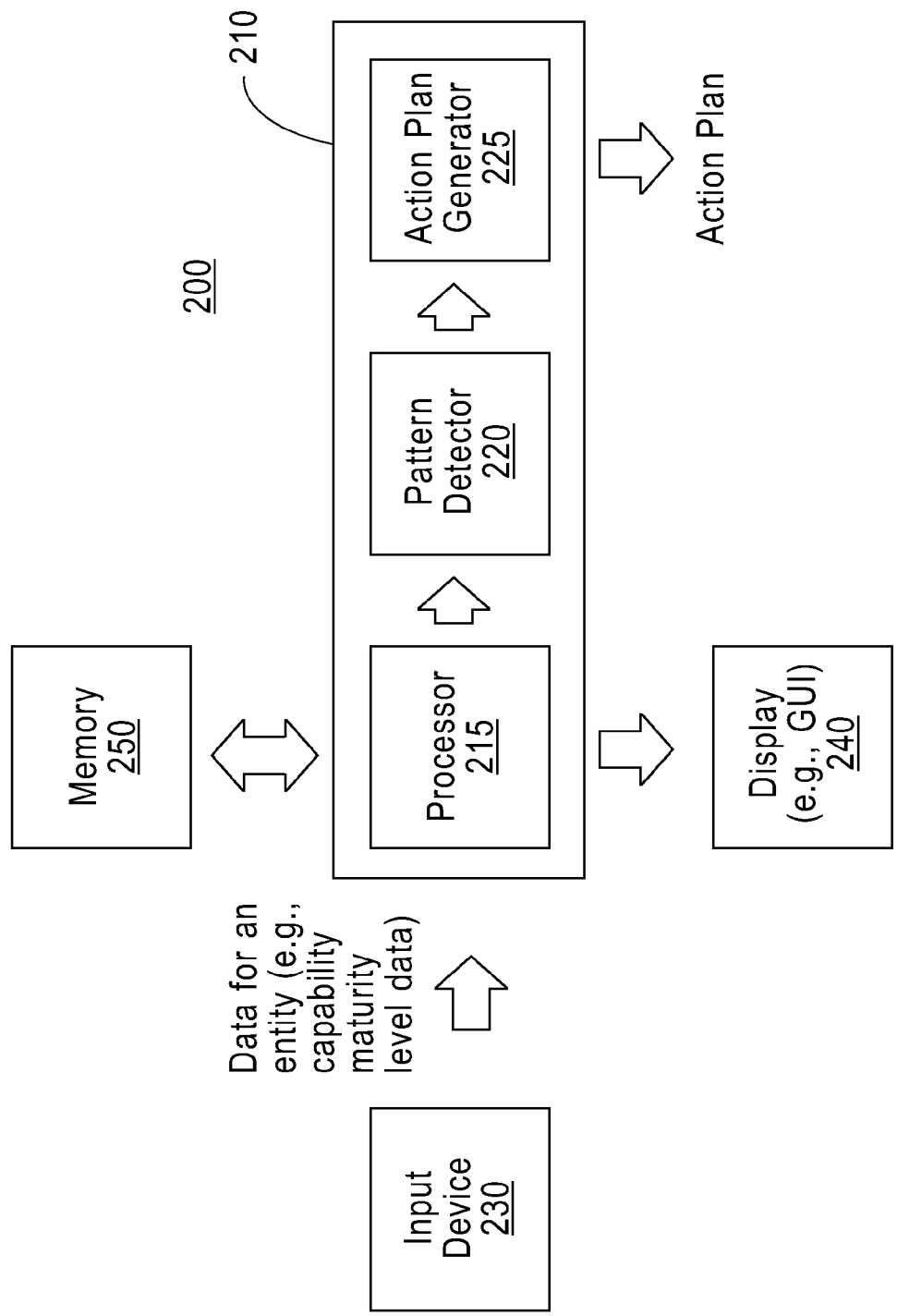
FIG. 2 illustrates a system 200 for analyzing capabilities of an entity, according to an exemplary aspect of the claimed invention.

FIG. 2 illustrates a system 200 for analyzing capabilities of an entity, according to an exemplary aspect of the claimed invention. The system 200 includes an input device (e.g., keyboard, mouse, etc.) for inputting data regarding an entity's capabilities, and a capability model 210 for detecting a capability pattern among the capabilities and generating an action plan based on the capability pattern.

The capability model 210 may exist in the form of a software program of machine-readable instructions which are tangibly embodied on a programmable storage medium and are executable by a digital processing apparatus to perform the method 100. That is, the capability model 210 may be implemented in the form of a software program which is executable by a computer which to detect whether a capability pattern exists, to generate an action plan, to generate plural display screens (e.g., see FIGS. 3, 4, etc.) which a user can use to analyze the capabilities of an entity, etc. A user may use the input device 230 to input data or make selections in response to a screen generated by the computer.

The capability model 210 may include a processor 215 for processing the data input by the input device 230, a pattern detector 220 for detecting a capability pattern in the processed data, and an action plan generator 225 for generating an action plan. The processor 215, pattern detector 220 and action plan generator 225 may be separately formed, or integrally formed together.

The system 200 may also include a memory 250 (e.g., RAM, ROM, etc.) which is accessible by the capability model 210 and may store instructions for performing the method 100, and data such as raw input data, patterns detected by the pattern detector 220, the action plan generated by the action plan generator 225, etc. The system 200 may also include a display device 240 (e.g., monitor, terminal, etc.) which may form part of a graphical or non-graphical user interface (GUI) including display screens which may be used to perform a method 100 according to an exemplary aspect of the invention.

The action plan generator 225 may receive detected patterns from the pattern detector 220 (e.g., pattern detecting module), and/or symptoms (e.g., a complex problem to be corrected as part of capability assessment results generated by the Processor 215) and generate an action plan based on the detected patterns and/or symptoms. The action plan may be output, for example, to the display device 240, printer, etc.

Figure 3:
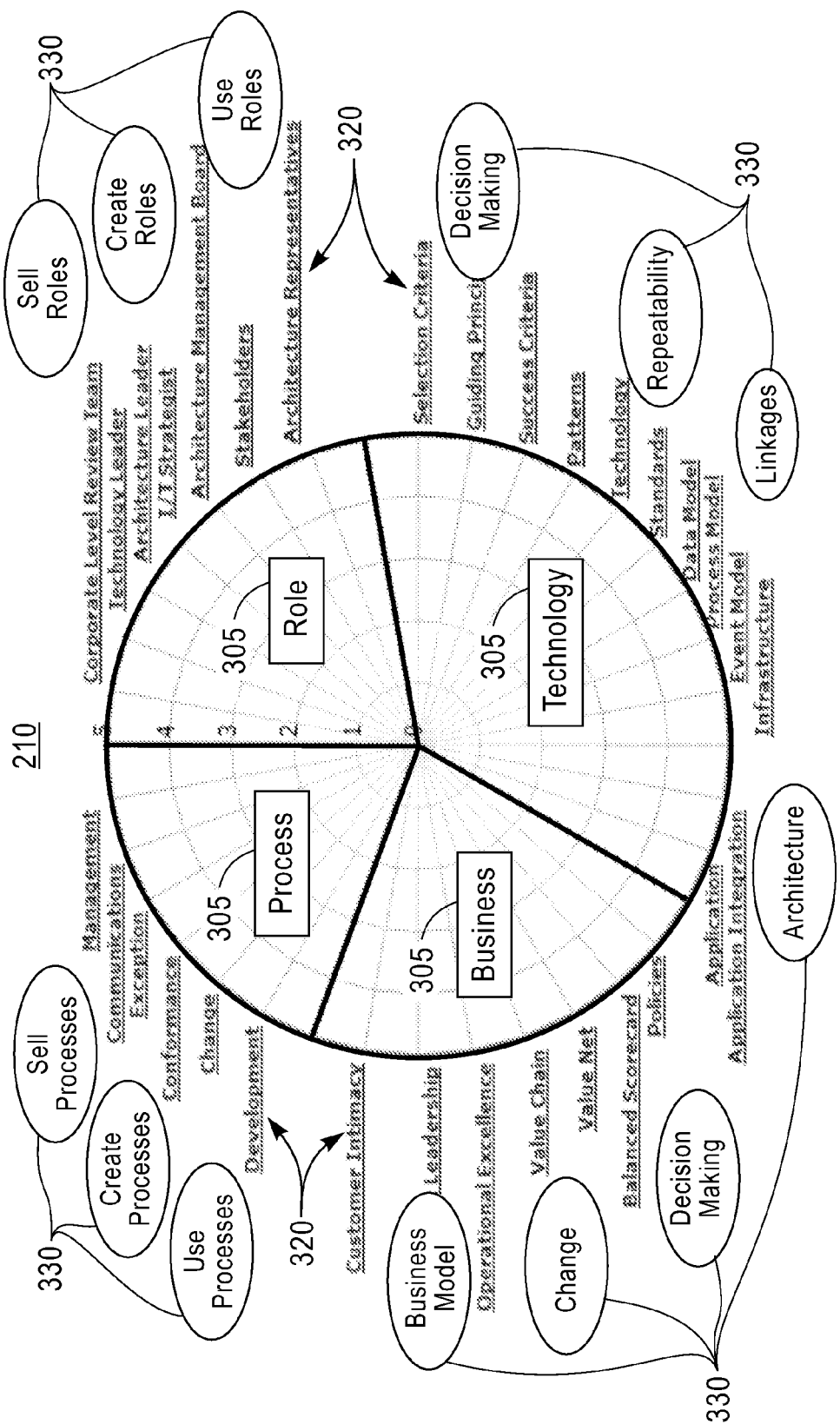
FIG. 3 illustrates a capability model 210 according to an exemplary aspect of the claimed invention.

FIG. 3 provides a schematic representation of the capability model 210 according to an exemplary aspect of the present invention. The capability model 210 can perform analysis not just at a broad level but at the individual capability level, and therefore, provides a more detailed analysis of an entity's capabilities than conventional capability models.

As illustrated in FIG. 3, the capability model 210 may group capabilities 320 into a Domain 305 (e.g., category) which is an exclusive grouping of the capabilities (e.g., a capability can belong to only one domain 305), and a Functional Area 330 which is a nonexclusive grouping of the capabilities (e.g., a capability can belong to more than one functional area 330). For example, in the exemplary aspect of FIG. 3, the capability model 210 has grouped the capability 320 of Technology Leader into the Domain 305 of Role and the Functional Area 330 of Sell Roles.

The capability model 210 may identify Analysis Patterns based on potentially significant correlations among data regarding an entity's individual capabilities. The capability model 210 may also identify capability patterns which are based on one or more Analysis Patterns, and which may add to one or more analysis patterns, one or more predictive symptom patterns and one or more prescriptive patterns. The prescriptive patterns, which may translate into actions, may be prioritized according to an entity's business model, which can be obtained, for instance, by derivation from responses to the model, or explicitly from the entity, or through other prioritization approaches relevant to the entity.

To provide these features, the capability model 210 may store a list of capabilities for an entity such as a person, company, corporation, partnership, governmental entity, etc., and the maturity levels associated with those capabilities. A capability may be assigned plural levels, and those plural levels may be assigned a numerical value having an associated description. That is, a capability may have a definition (e.g. "technology leader"), a description, and a closed set of possible maturity values (e.g., 0-5) which are independently defined for each capability with each value having an associated description.

The capability model 210 may group the capabilities initially into exclusive Domains 305 (e.g. roles, artifacts, processes). However, in contrast to conventional models, the capability model 210 may allow a single capability to participate simultaneously in multiple functional areas which span the Domains around a given context (e.g. sell, use, create, decision making, etc.).

Further, groupings of capabilities in the capability model 210 can also include other groupings. That is, the capability model 210 may group the capabilities may be grouped in the form of nested hierarchies.

Further, the capability model 210 may identify user response patterns in the functional areas which have a high correlation to known and knowable positive effects (e.g., desirable results which should continue post-assessment) and/or negative effects (e.g., issues). For example, the capability model 210 may identify patterns which can lead an entity from a position of a negative effect to one of a positive effect. This may help the entity to selectively improving specific capabilities (e.g., in a specific sequence).

Conventional capability models do not alert an entity of these patterns of improvement, and this lack of awareness causes organizations to initiate plans to improve results which cause the opposite result. The capability model 210, on the other hand, may leverage a linkage between user response patterns and effects with additional pattern identification to create an action plan to resolve a negative effect (e.g., issue).

The capability model 210 may also arbitrarily create different "groups" of capabilities. The "group" concept/construct is useful in the present invention because it may help to define some logical unit or "meta" capability. By arbitrarily creating new groups, the capability model 210 may create the equivalent of defining more "capabilities". This may be considered as an extension of the capability model.

A "group" may also define a logical unit that may be associated with a symptom. A "symptom" may be, for example, a problem that an entity has encountered and wants to improve upon.

As noted above, the capability model 210 may identify Analysis Patterns based on potentially significant correlations among data regarding an entity's individual capabilities. An "analysis pattern" may be defined, or example, by one or more rules indicating a required relationship between "entity characteristics". Such characteristics may include, for example, maturity levels for plural capabilities of the entity, plural patterns detected for the entity, etc. Thus, an "analysis pattern" may be described as a "capability pattern" when the analysis pattern is defined by rules indicating a required relationship between capabilities of the entity. That is, a capability pattern may be defined as a rule indicating a relationship between capabilities of an entity.

Further, an "analysis pattern" may relate to a single group (e.g., there may be only one group associated with one analysis pattern) or an analysis pattern may relate to more than one group. When an analysis pattern relates to a group, the analysis pattern can relate to one or more of the group's members. This relationship between "patterns" and "groups" can be expressed in mathematical group notation.

An "analysis pattern" may also be associated with a symptom which describes an expected behavior resulting from the pattern, and a prescription which describes a suggested action to overcome the symptom. Further, another analysis pattern may be formed by combining a plurality of an analysis patterns. In addition, the functional areas of the capability model may be modifiable based on a predetermined criteria (e.g., the entity being evaluated).

The capability model 210 may also store historical data (e.g., empirical data) of entity behavior, and use the historical data to identify analysis patterns for the entity. The analysis patterns may be stored and used to predict a behavior and generate an action plan for the entity.

For example, assuming that historical data is input to or stored (e.g., in memory 250) for use in the capability model 210 and the data indicates that when an entity has a strong corporate level review team, that entity will likely also have a weak technology leader, if a user later inputs data into the capability model 210 indicating that the entity has a strong corporate level review team, the capability model 210 would likely inform the user that the entity is likely to have a weak technology leader and suggest an action plan for strengthening the technology leader.

The capability model 210 may identify "analysis patterns" between capability maturity levels (e.g., if an entity has maturity level of 0 for capability X, then the entity will likely have a maturity level of 5 for capability Y), or between other characteristics which are considered by the capability model, such as two patterns (e.g., if pattern X is detected for the entity, then pattern Y will likely exist for the entity), between groups of capabilities (e.g., if the entity is highly capable in the technology area capabilities, then the entity will likely have a low capability in business area capabilities), between a particular capability and a pattern, or between a particular capability and a group of capabilities, and so on.

The capability model 210 may identify the "analysis patterns" based on user responses to inquiries relating to capability maturity levels. The capability model 210 may also automatically update a "pattern database" to add, delete or modify a pattern in the pattern database, based on data input or stored in the capability model 210.

The capability model 210 may also associate an analysis pattern with a "symptom" that is typical of the pattern. This allows the capability model 210 to generate an action plan which suggests an action for addressing that symptom.

Referring again to FIG. 3, a user may use the input device 230 to input capability data to the capability model 210 in response to questions generated by the capability model 210 and displayed on the display device 240. Such data may include, for example, the capabilities 320 which are relevant to the capability model 210. The Processor 215 may process the input data to generate a capability profile for the entity (e.g., a graphical representation of the entity's capabilities). The pattern detector 220 may receive the capability profile for the entity from the Processor 215 and detect from the capability profile, analysis patterns associated with the entity, and capability patterns associated with the entity. The action plan generator 225 may receive the detected patterns and based on the detected patterns, generate an action plan for solving problems for the entity or improving the performance of the entity.

The capability model 210 may also compare the user's responses and priorities with a stored set of predefined analysis artifacts to create an action plan. A first artifact utilized may include the capability model itself.

As noted above, the capability model 210 may organize the capabilities 320 into Functional Areas 330, which is an important feature of the claimed invention. These Functional Areas 330 include a group of related capabilities 320 that may span Domains 305 and make up a given function performed in the topical area. The Functional Areas 330 can be defined in a very flexible fashion, enabling the capabilities 320 to be grouped into multiple Functional Areas 330.

Further, the Functional Area 330 may be defined "on the fly" which allows the present invention to match the different needs of different users. That is, the capability model 210 itself may be fixed, but the mechanism for making the capability model 210 may be much more flexible and adaptable than conventional methods and systems, by introducing the concept of and ability to create functional areas 330.

For example, as illustrated in FIG. 3, the capability model 210 may include a "sell" Functional Area 330 which relates to ROLES and another "sell" Functional Area 330 that relates to PROCESSES. In this example, both of these Functional Areas may be entitled "sell" because they may both relate to successfully selling an architecture.

For example, the Sales Role may have several patterns in it, and the Sales Process may have several patterns in it. Sales, created by combining the Domains 305 of Role and Process, may include additional analysis patterns as described, for example, in U.S. Patent Application to Robert D. Dill, entitled "METHOD, SYSTEM, AND STORAGE MEDIUM FOR CREATING AND MAINTAINING AN ENTERPRISE ARCHITECTURE" (U.S. patent application Ser. No. 10/299, 639; U.S. Patent Pub. No. 2004/0098392) which is commonly assigned with the present Application and incorporated by reference herein.

Further, a Functional Area 330 in the capability model 210 may include a nested Functional Area. Thus, an analysis pattern can be built from another analysis pattern.

Figure 4:
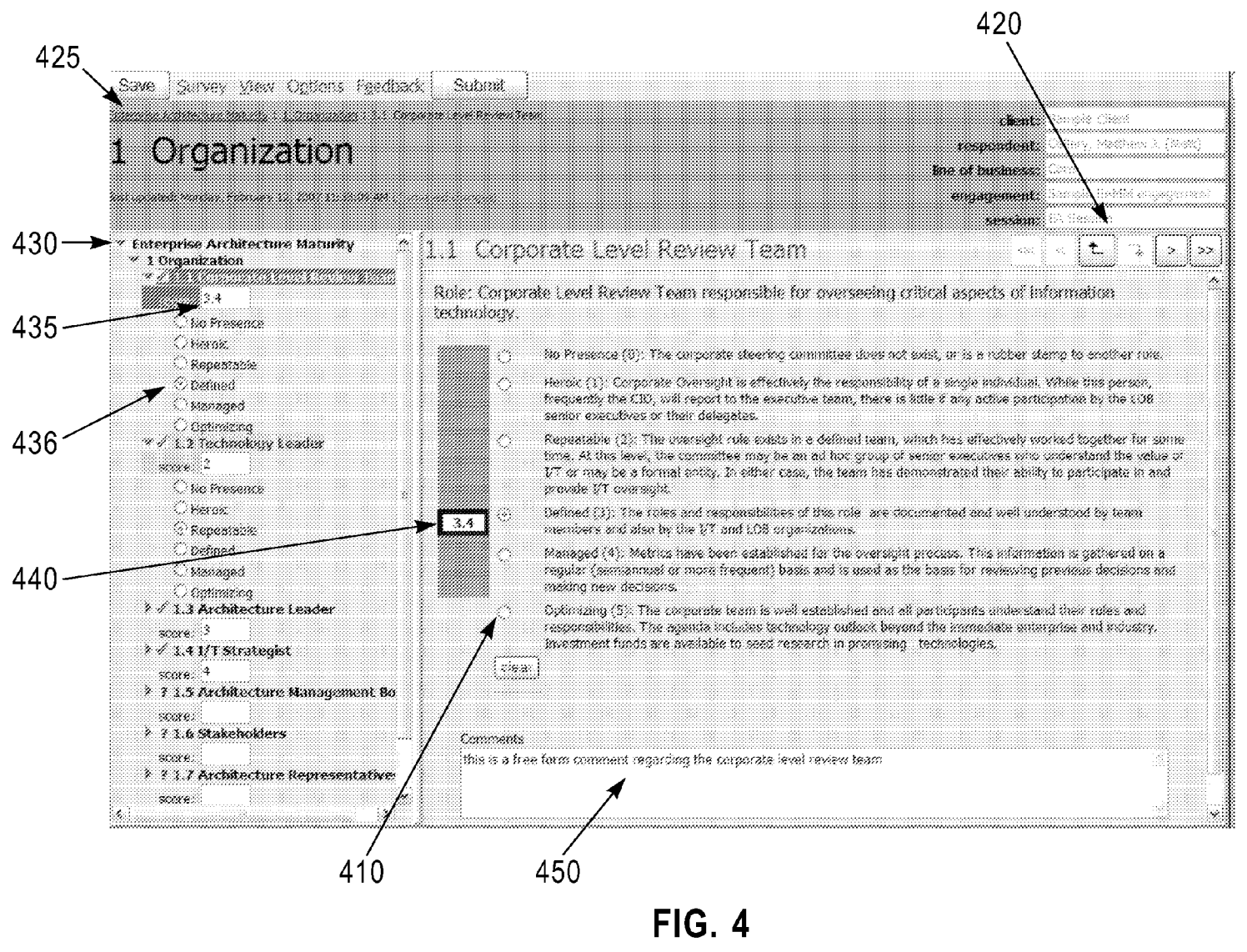

FIG. 4 illustrates an individual capability level screen 400, according to an exemplary aspect of the claimed invention. The screen 400 may be displayed as part of a GUI implemented on the display device 240.

The screen 400 may include maturity level selection buttons 410, navigation buttons 420 (e.g., previous, next, up down), a breadcrumb 425 showing the location in the maturity models hierarchy, and a navigable tree 430 with the maturity model's hierarchy. The tree 430 may include an input box 435 to allow direct key entry of a value, and selection buttons 436 for allowing value selection.

The screen 400 may also include a window for viewing a capability 320 (e.g., "corporate level review team"). The window may also include a slider control 440 for allowing a user to select intermediate maturity values, and a comment field 450 for allowing a user to insert comments.

In the exemplary aspect of FIG. 4, the capability 320 is defined as "Corporate Level Review Team" and is described as being in the domain "Role" and as "Corporate Level Review Team responsible for overseeing critical aspects of information technology". Further, the capability 320 includes a closed set of possible maturity values 0 through 5. For example, the maturity value of "0" is labeled "No presence" and has the associated description of "The corporate steering committee does not exist, or is a rubber stamp to another role", and the maturity level of "5" is labeled "Optimizing" and has the associated description of "The corporate team is well established and all participants understand their roles and responsibilities. The agenda includes technology outlook beyond the immediate enterprise and industry. Investment funds are available to seed research in promising technologies".

As depicted in FIG. 4, for a given capability 320, a maturity level description may be defined for a user to rate an entity against, selecting the most appropriate level for a capability. For example, if a user is using the present invention to analyze his company's capabilities and the user believes that his company's corporate steering committee is merely a "rubber stamp", may rate his company by selecting "0" in response to a display of the capability 320 of FIG. 4. Such ratings may be mapped to numerical values and may be used by the capability model 210 to generate an action plan.

In particular, a user may view the GUI displaying the capability 320 in FIG. 4 and use an input device such as a keyboard or mouse to move a cursor over a maturity value 410 and "left click" the mouse to select that maturity value, and hit "enter" to input the selection into the system 200. The capability model 210 may use data initially input by the user to form a capability Profile for the entity. (The capability profile will be described later with respect to FIG. 7.)

After forming the capability profile for the entity, the system 200 may define the analysis patterns that may be used to process data which is subsequently input for the entity.

Figure 5:
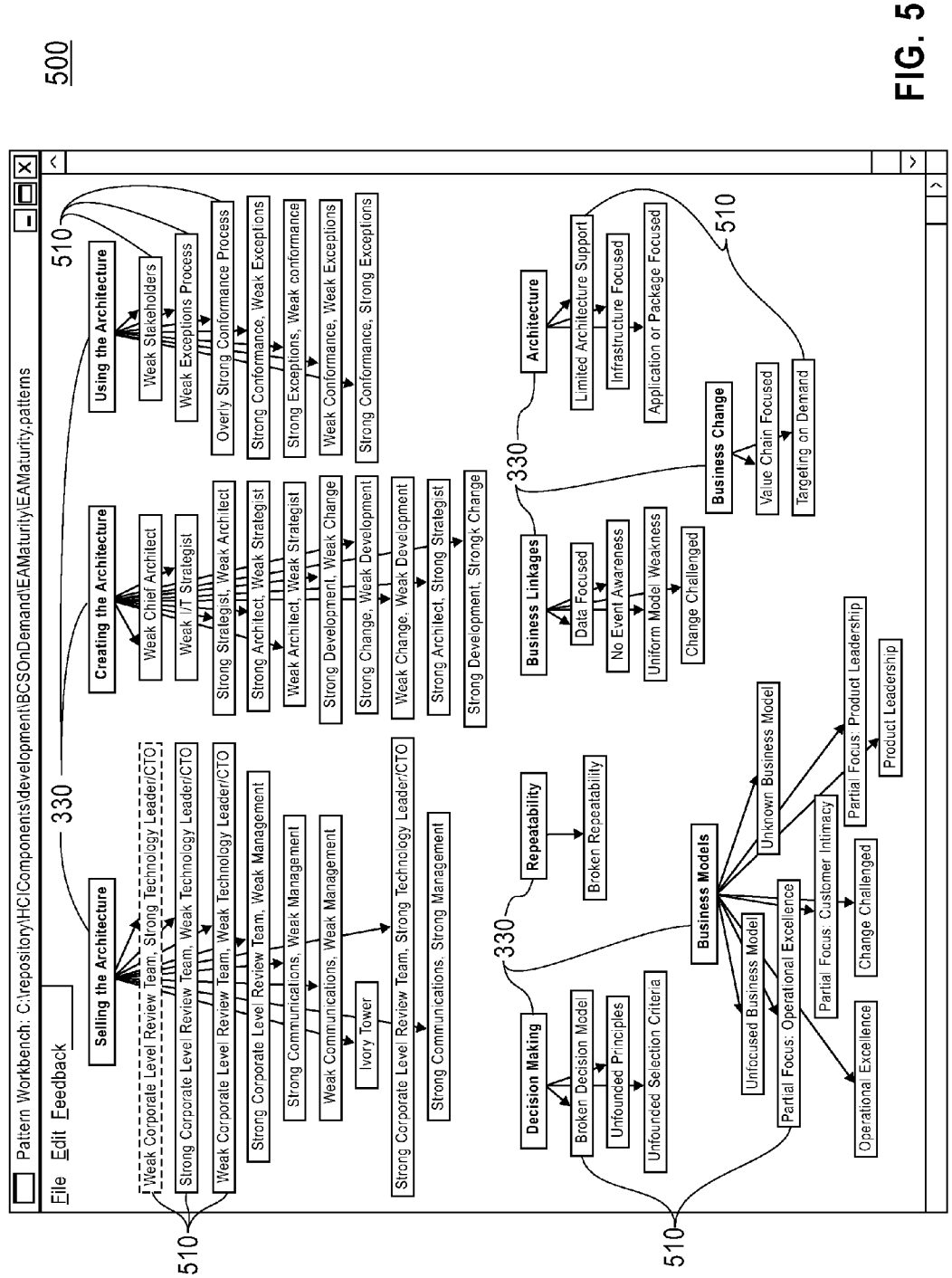
FIG. 5 illustrates a screen 500 which may be generated according to an exemplary aspect of the present invention.

FIG. 5 illustrates a pattern workbench screen 500 which may be generated by the capability model 210, and which displays the functional areas 330 as part of a GUI implemented on a display device. FIG. 5 shows how for the functional areas 330 defined for the capability model 210, patterns for a functional area 330 can now be defined that identify relationships to be found between capabilities in that functional area (e.g., Strong Steering Committee, Weak CTO, etc.). Note that the patterns may be as broad as possible. For example, the pattern could just be a capability that is present or not present, or any range of levels.

More specifically, FIG. 5 illustrates how patterns 510 can be described and associated with the capabilities 320 for those functional areas 330. For example, in the exemplary aspect illustrated in FIG. 5, the functional area 330 entitled "Selling the Architecture" may be associated with a pattern 510 entitled "Weak Corporate Level Review Team, Strong Technology Leader/CTO)", a pattern 510 entitled "Strong Corporate Level Review Team, Weak Technology Leader/CTO)", and so forth.

Figure 6:
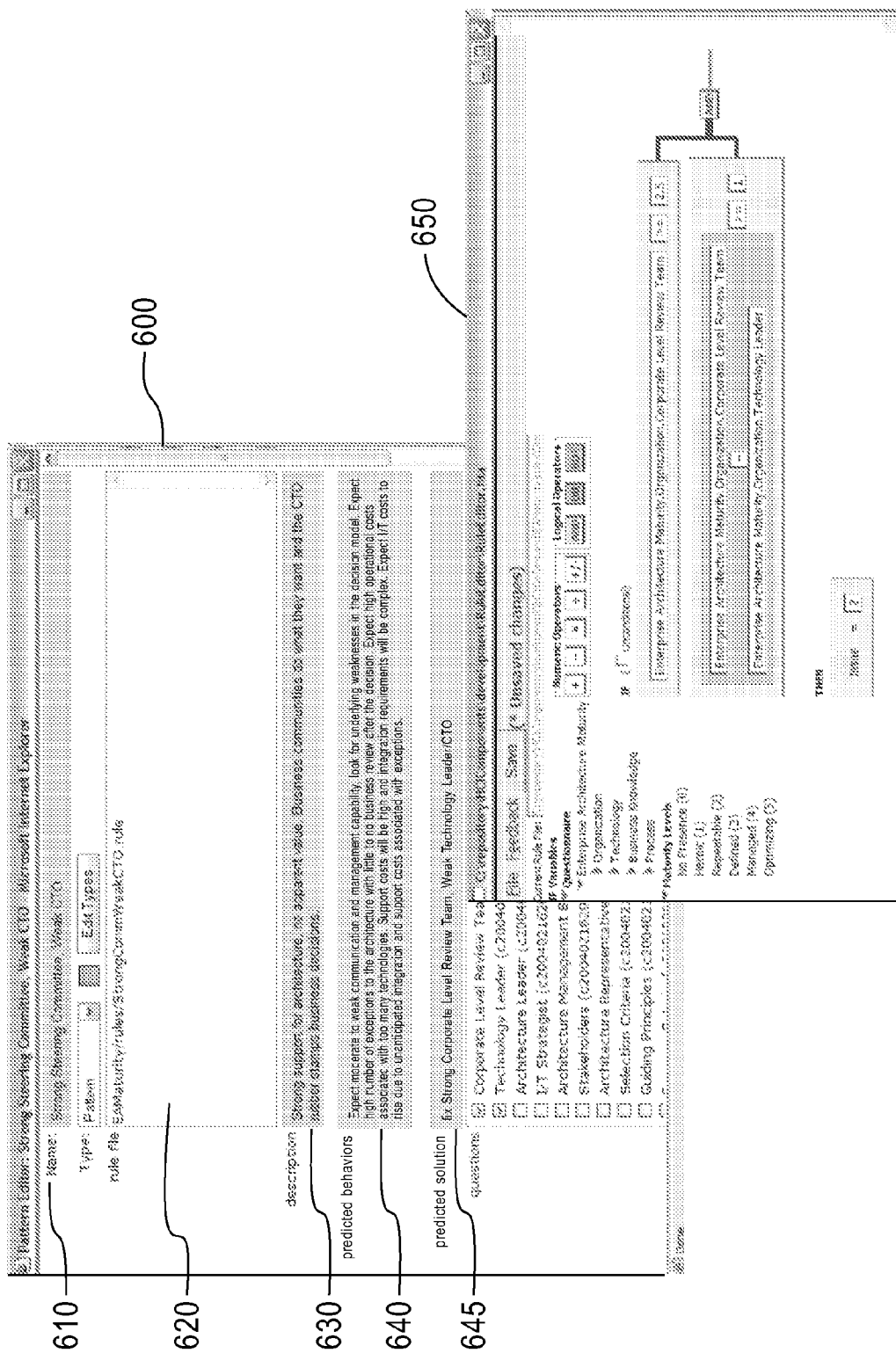
FIG. 6 illustrates a pattern editor screen 600 and a rule editor screen 650 which may be generated, according to an exemplary aspect of the present invention.

FIG. 6 illustrates a pattern editor screen 600 and a rule editor screen 650 which may be generated by the capability model 210, and which may be used for editing a pattern 510 and a rule associated with a pattern 510, as part of a GUI implemented on a display device. The screen 600 provides an example of how the patterns may be defined in detail containing a name, a description, driving capabilities (e.g., what capabilities are involved in this pattern), predicted symptoms (e.g., what problem characteristics are likely be present for the user when this pattern exists), prescribed resolution (e.g., a description of how to fix the problem characteristics), and a rule (e.g., describing a relationship between the driving capabilities that determine this pattern's existence and severity).

The screens 600, 650 may include windows for displaying/editing features associated with a pattern 510. A user may use the screens 600, 650 to edit or view these features. For example, the screen 650 may be used to display/edit a rule which may be used to identify a pattern in the entity data which was input by a user.

For example, screen 600 may include a name window 610 for displaying/editing a name of a pattern, a rule file window 620 for displaying/editing a rule governing the pattern (e.g., determining the existence and severity of a pattern); a description window 630 for displaying/editing a description of the pattern, a symptom window 640 (e.g., predicted behaviors window) for displaying/editing a symptom of the pattern (e.g., an expected behavior resulting from the given pattern), a prescription window 645 (e.g., prescribed solution window) for displaying/editing a prescription (e.g., an action or actions which are suggested for overcoming the symptom).

As noted above, the pattern detector 210 may also identify a "symptom" handling a complex problem (e.g., a problem involving two of more functional areas 330), which may be used by the action plan generator 225 to generate an action plan. While the symptom may be specified in coarse grain terms using functional areas making the functional areas easier to articulate, the analysis when performed, may describe more precise resolution steps based on the prescribed resolutions of the patterns 510 found under the functional areas 330 in the list (e.g., the ordered list).

Figure 7:
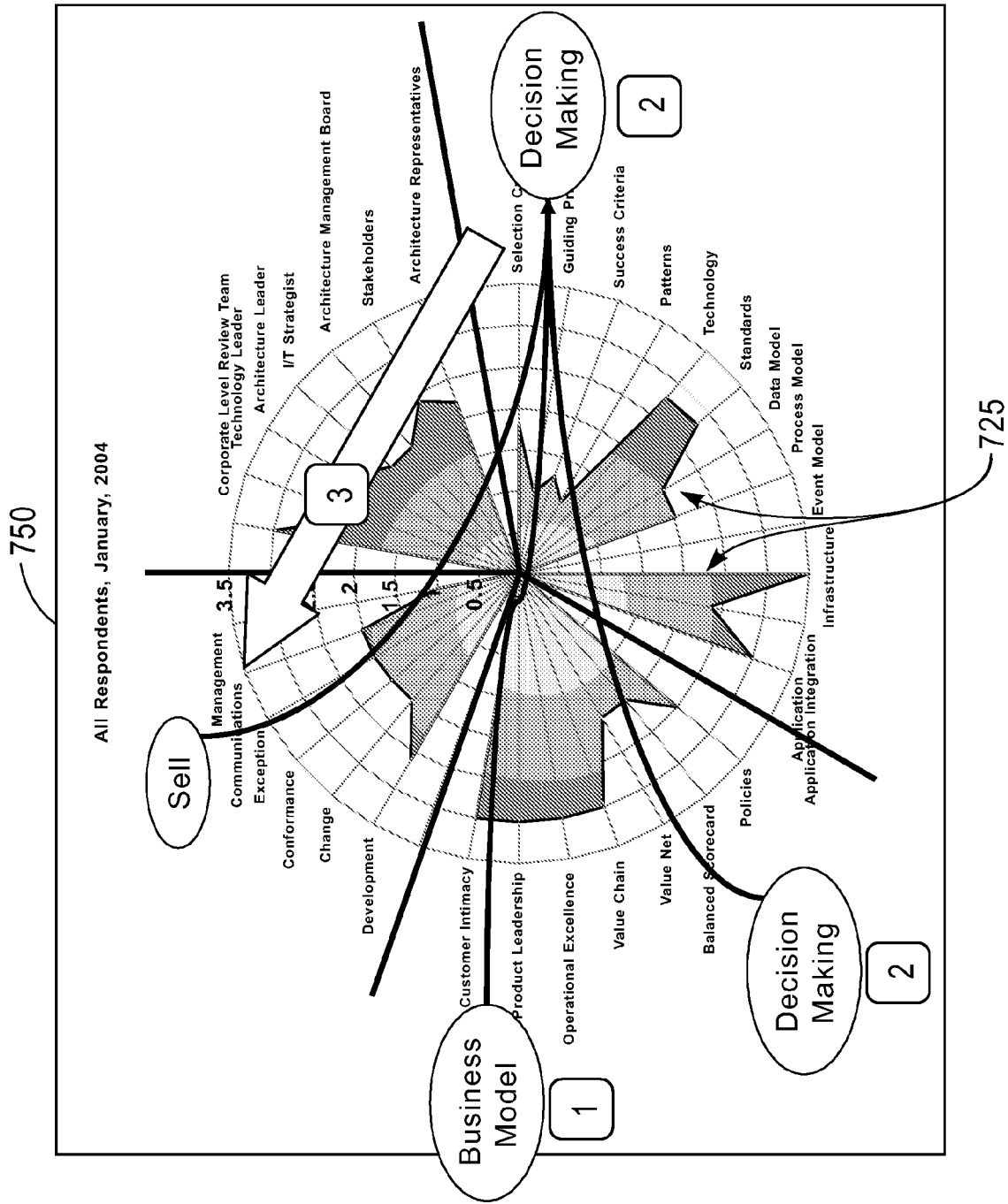
FIG. 7 illustrates a screen 700 which may be generated according to an exemplary aspect of the present invention.

FIG. 7 illustrates how the capability model 210 may use a capability profile 725 to generate an action plan for addressing a symptom. For example, the capability profile 725 may be displayed as a screen 750 in a GUI implemented on a display device which may allow a user to analyze an entity's capabilities. That is, based on data input by a user, the capability model 210 may cause a display screen 750 to be generated which highlights the areas of the capability model 210 which should be addressed in order to improve upon a symptom.

For example, the "symptom" to be resolved in the exemplary aspect of FIG. 7 is "improving a perceived value of enterprise architecture (EA)". This "symptom" deals with how, when and why corporate and the lines of business work together on architecture related topics.

The capability model 210 may generate an action plan which identifies the areas of capabilities that need to be addressed to resolve this "symptom". For example, the action plan may identify an ordered set of functional areas for resolving this symptom, such as 1) Understand your core business model, 2) Explicitly define the Information Technology (IT) Decision model based on your core business model, and 3) Communicate the results of these actions and initiatives. The action plan may be generated and displayed, for example, in writing and/or in the form of the capability profile 725 (e.g., the shaded area of the graph) which includes a graphical representation of the capabilities for the entity, and the suggested course of action (e.g., the bold arrows superimposed on the graph) for solving the complex problem.

FIGS. 8A-8B, 9 and 10 depict a result of applying the analysis patterns against given sets of user response results.

Figure 8A:
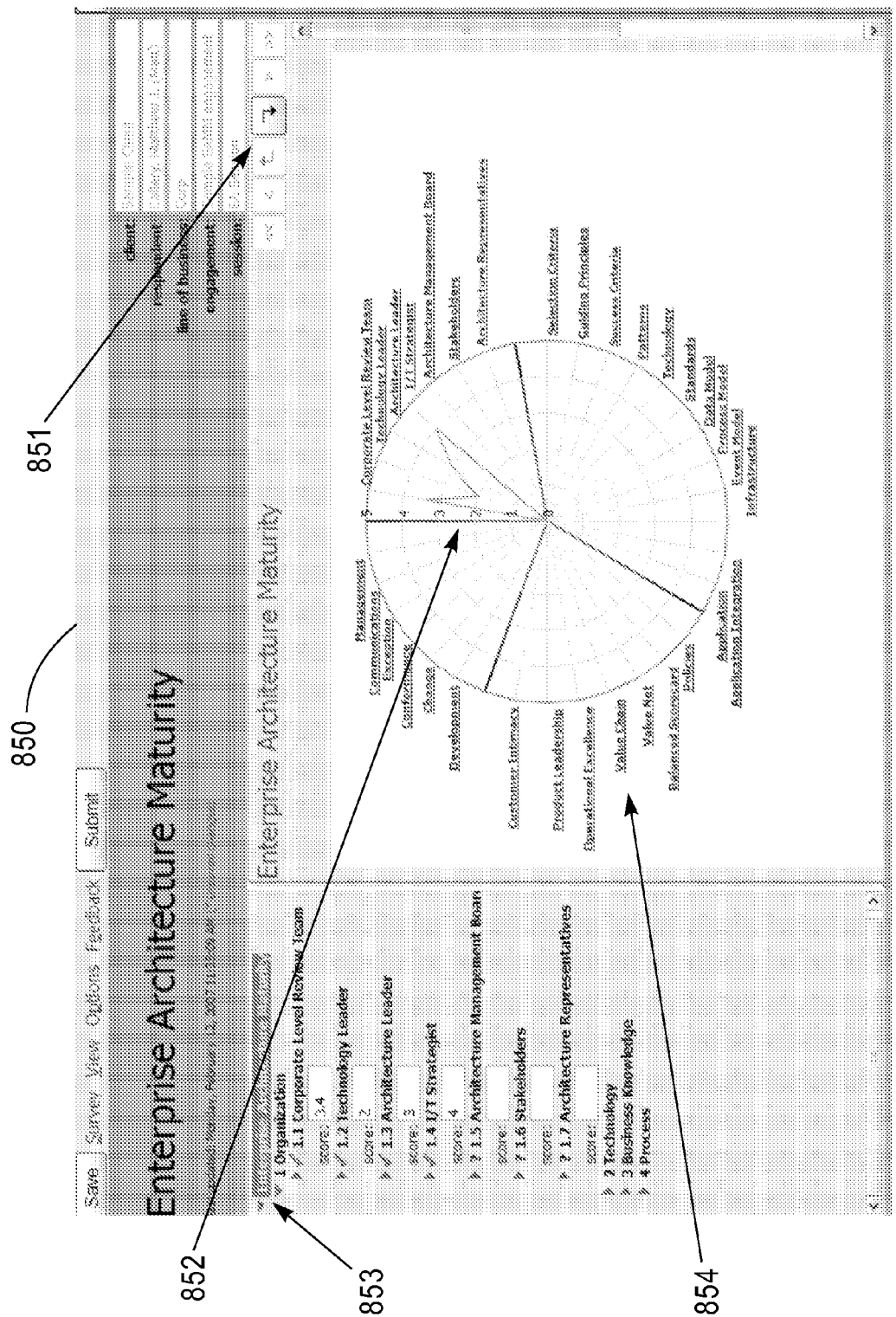
FIGS. 8A-8B illustrate root and category level screens 850, 800 which may be generated according to an exemplary aspect of the present invention.

FIG. 8A illustrates an exemplary root and category level screen 850 which may be generated by the system 200 as part of a GUI implemented on a display device to allow a user to analyze an entity's capabilities. The screen 8A may include navigation buttons 851 (e.g., previous, next, up, down, etc.) for navigating, a graphical depiction 852 of a maturity model with the current selected values depicted, a navigable tree 853 including the maturity model's hierarchy, and links 854 on which the user may click to navigate directly to any capability in the capability model 210.

Figure 8B:
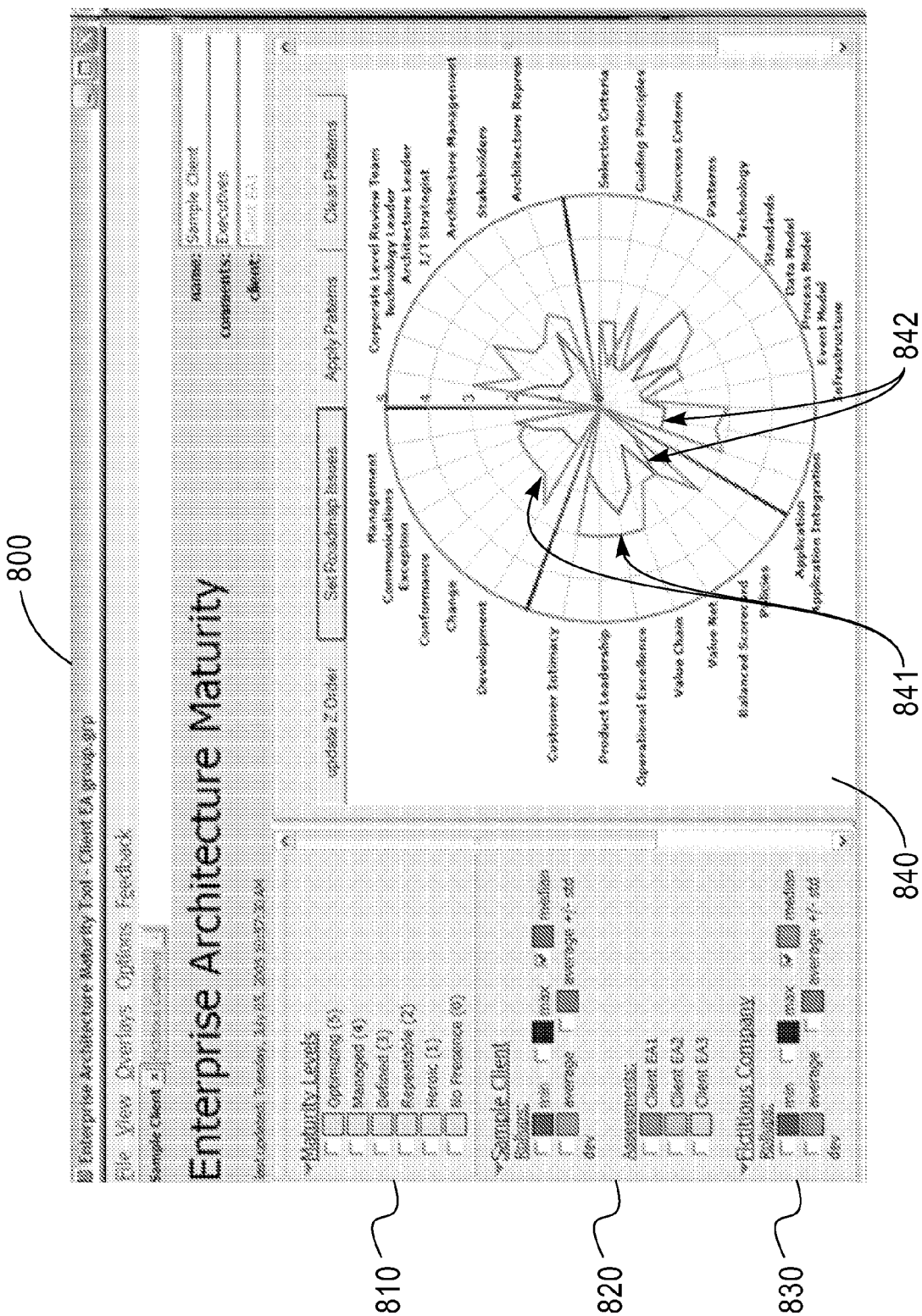

FIG. 8B illustrates another exemplary root and category level screen 800 which may be generated by the system 200 as part of a GUI implemented on a display device to allow a user to analyze an entity's capabilities. Specifically, FIG. 8B illustrates two different capability profiles for companies, "Sample Client" and "Fictitious Company".

The screen 800 provides a mechanism for comparing the capabilities of two or more entities. The entities may include an entity and a fictitious company for comparison against that entity. Alternatively, the entities may include two entities for which a capability model has been generated (e.g., an entity for which data has been input to capability model 210).

For example, the clients A and B may have expressed a desire to address the same symptom of wanting to "improve the perceived value of the Enterprise Architecture". As illustrated in FIG. 8, the screen 800 may include a maturity level area 810, Sample Client area 820, and a Fictitious Company area 830 which may allow a user to view, input, edit, and/or delete data pertaining to these topics. The screen 800 may also include a graph area 840 which provides a graphical representation of the capabilities of entity A and entity B in the form of capability profiles 841, 842, respectively.

That is, the capability profiles 841, 842 may be plotted together on the same chart to allow for easy comparison of the profiles. For example, the profiles 841, 842 may be displayed on the chart using different colors, line widths, line types (e.g., dotted lines, dashed lines, etc.), etc. in order to clearly distinguish the profiles 841, 842.

FIG. 9 illustrates an application of functional areas and patterns according to an exemplary aspect of the present invention. That is, capability model 210 may generate a screen 900 as part of a GUI implemented on the display device 240. In the exemplary aspect of FIG. 9, the functional area maturity values for a Sample Client and a Fictitious Company are evaluated using a broad analysis.

For example, the upper portion 910 of FIG. 9 illustrates a Functional Area maturity level evaluation, which may be dynamically calculated by averaging the response results for the area's relevant capabilities for these entities. This provides for broad recommendations to be delivered. The lower portion 920 of FIG. 9 provides examples of individual patterns found for the two companies. These patterns may be matched to a user by comparing the user's response results against the rule formula defined for the pattern. For a predetermined relationship, such as when the function matches the pattern, the pattern may be considered to be present. As depicted in FIG. 9, for example, given the difference in the two users' responses, different patterns were found to be true.

As illustrated in FIG. 9, the screen 900 may include "found patterns" which specify predicted behavior and severity score, and which may be matched appropriately based on the patterns' rules to the scored capabilities of each client. The resulting list of "found patterns" can vary from client to client.

Figure 10:
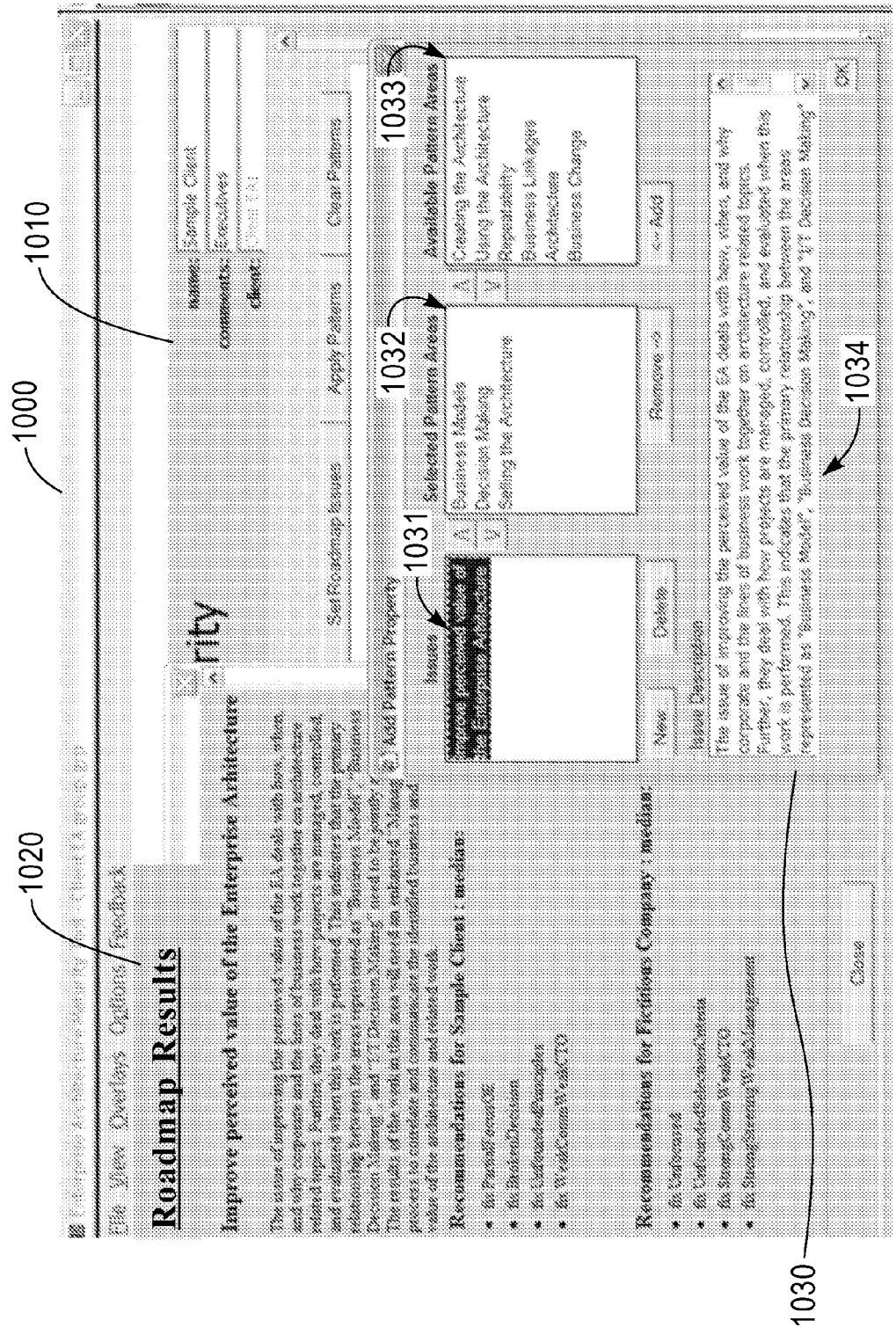
FIG. 10 illustrates a screen 1000 for displaying an action plan which may be generated according to an exemplary aspect of the present invention.

FIG. 10 illustrates a screen 1000 for displaying an action plan which may be generated by the capability model 210 as part of a GUI implemented on the display device 240. For example, a user may use the input device 230 to input priorities and respond to inquiries generated by the capability model 210, and the action plan generator 225 may generate the action plan displayed in screen 1000 based on a pattern and/or symptom detected in the pattern detector 220.

The action plan may include a description of a symptom, and an ordered set of the functional areas to be addressed for resolving the symptom. An ordering of the functional areas for the symptom may be determined based on dependencies between the functional areas. An entity may then use the action plan to resolve the symptom. In addition, the entity may rate the effect of implementing the action plan, and input the rating back into the capability model in order to update and improve the performance of the capability model. For example, if the entity implemented the action plan and it was completely ineffective, the entity may input a "zero" rating into the capability model, and request that the capability model generate a new action plan.

The screen 1000 may include a first window 1010 for illustrating how the symptom may be defined with its description and ordered list of functional areas. The screen 1000 may also include a second window 1020 for illustrating the action plan generated by applying a symptom to the user's responses. For each functional area in the ordered list which is described for the symptom, the functional area's patterns may be evaluated against the user's results. If the pattern is true based on the evaluation, then the prescribed solution for the pattern is outputted as an individual step in the total resolution of the symptom.

The action plan depicted in window 1020 may, for example, list the symptom or symptoms that the user felt were important to correct based on the user's priorities. For each symptom, the individualized list of resolution steps may be listed and ordered based on the patterns matched from the symptom's functional area pattern evaluation as discussed above.

While the symptoms may be described in terms of functional areas (e.g., business model, decision making, selling architecture), the resulting action plan may include steps that are individualized for each client based on the patterns (e.g., unfocused business model; unfounded selection criteria; strong corporate level review team, weak technology leader/CTO; strong corporate level review team, weak management) within those areas found to be true for each client.

The screen 1000 may also include another window 1030 for allowing a user to add a pattern property. The window 1030 may include, for example, a window 1031 for displaying/editing symptoms, a window 1032 for displaying/editing selected pattern areas, a window 1033 for displaying/editing available pattern areas, and a window 1034 for displaying a symptom description.

As evidenced in FIGS. 9 and 10, since different users may have different patterns matching their results, the steps identified in the symptom resolution for a given user may be individualized based on the patterns 510 found for that user from the functional areas 330 described in the symptom.

The capability model 210 may allow a user to select a symptom from a plurality of symptoms, and/or prioritize the plurality of symptoms. The capability model 210 may also allow a user to develop a client portfolio, and may also provide for a grouping of different clients/users/companies based on various criteria (e.g., by a company's technology area, by a company's market capitalization, etc.), benchmarking (e.g., setting benchmarks or goals for a client), comparison between different clients, etc.

The capability model 210 may also be configured by a user to automatically provide for these features such as under a predetermined condition. For example, the capability model 210 may automatically compare a client to one or more clients in a given technology area, in another technology area, in a same geographical area, etc.

Referring again to the drawings, FIG. 11 illustrates a typical hardware configuration which may be used for implementing the computer system and method according to the exemplary aspects of the present invention. The configuration has preferably at least one processor or central processing unit (CPU) 1111. The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, and Intranet, a personal area network (PAN), etc., and a display adapter 1136 for connecting the bus 1112 to a display device 1138 and/or printer 1139. Further, an automated reader/scanner 1141 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1111 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 1111 and hardware above, to perform the method of the invention.

This signal-bearing media may include, for example, a RAM contained within the CPU 1111, as represented by the fast-access storage for example. Alternatively, the instructions may be contained in another signal-bearing media, such as a magnetic data storage diskette 1200 (FIG. 12), directly or indirectly accessible by the CPU 1111.

Whether contained in the computer server/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C" etc.

Figure 13:
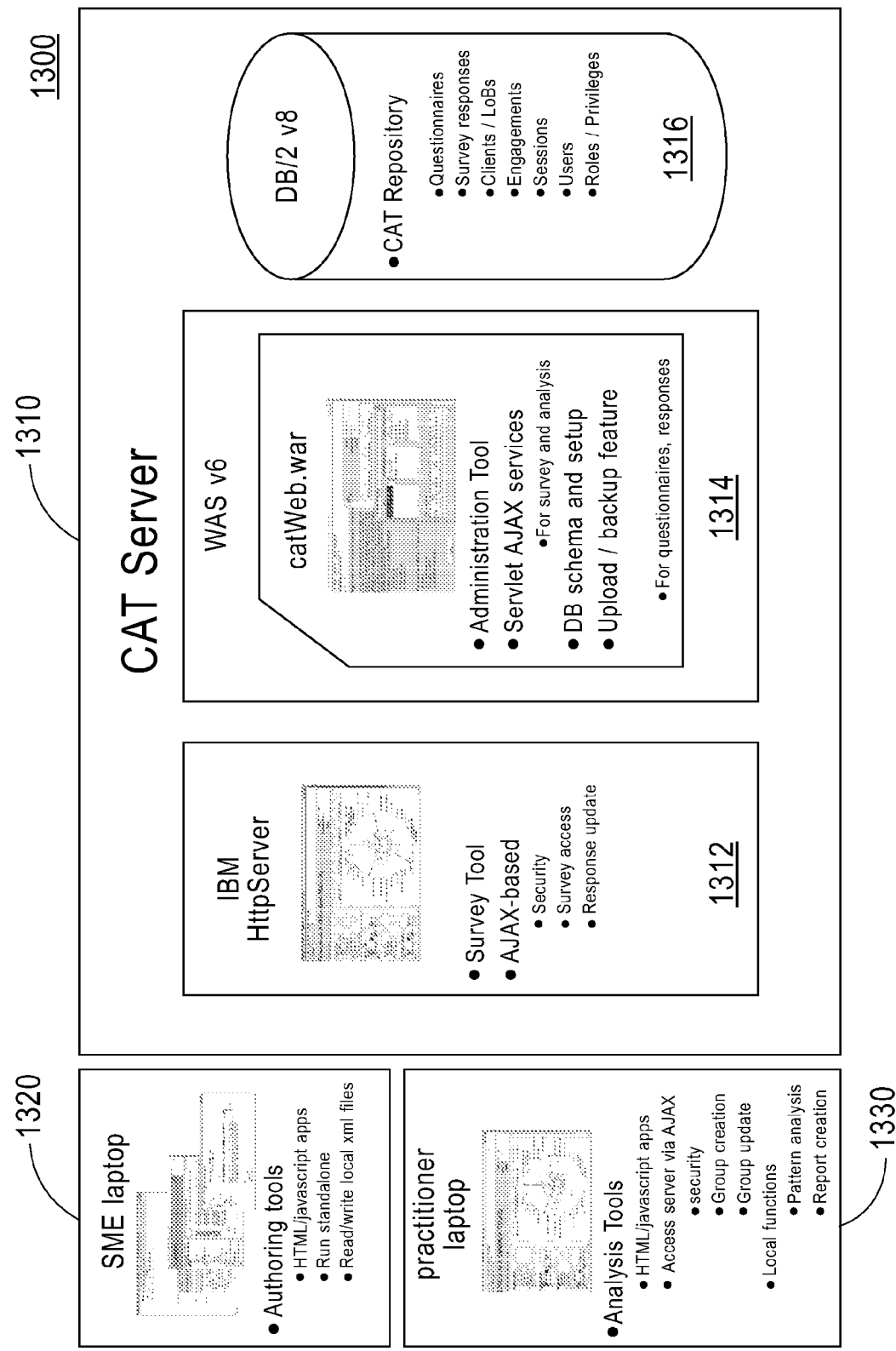
FIG. 13 illustrates a capability assessment tool (CAT) overall architecture 1300 for implementing the system 200, according to an exemplary aspect of the present invention.

Referring again to the drawings, FIG. 13 illustrates a capability Assessment Tool (CAT) overall architecture 1300 for implementing the system 200, according to an exemplary aspect of the present invention. The architecture 1300 may include a CAT server 1310 which may interface with a Small and Medium-sized Enterprise (SME) laptop 1320 and a practitioner laptop 1330.

The CAT server 1310 may include an HTTP server 1312 having a survey tool. The server 1312 may be Asynchronous Javascript technology and XML (AJAX)-based and provide for security, survey access and response updates. The CAT server 1310 may also include a Websphere Application Server (WAS) 1314 which may provide administration tools, Servlet AJAX services (e.g., for survey and analysis), database schema and setup, and an upload/backup feature (e.g., for questionnaires and responses). The CAT server 1310 may also include a CAT repository 1316 which may store, for example, questionnaires, survey responses, clients/lines of businesses (LoBs), engagements, sessions, users and roles/privileges.

Further, the SME laptop 1320 may include authoring tools such as HTML/Javascript applications, may run standalone, and may read/write local XML files. The practitioner laptop 1330 may include analysis tools such as HTML/Javascript applications, may securely access the CAT server 1310 via AJAX for group creation and group update, and may include local functions such as pattern analysis and reporting results such as the creation of a group and the generation of an action plan.

Figure 14:
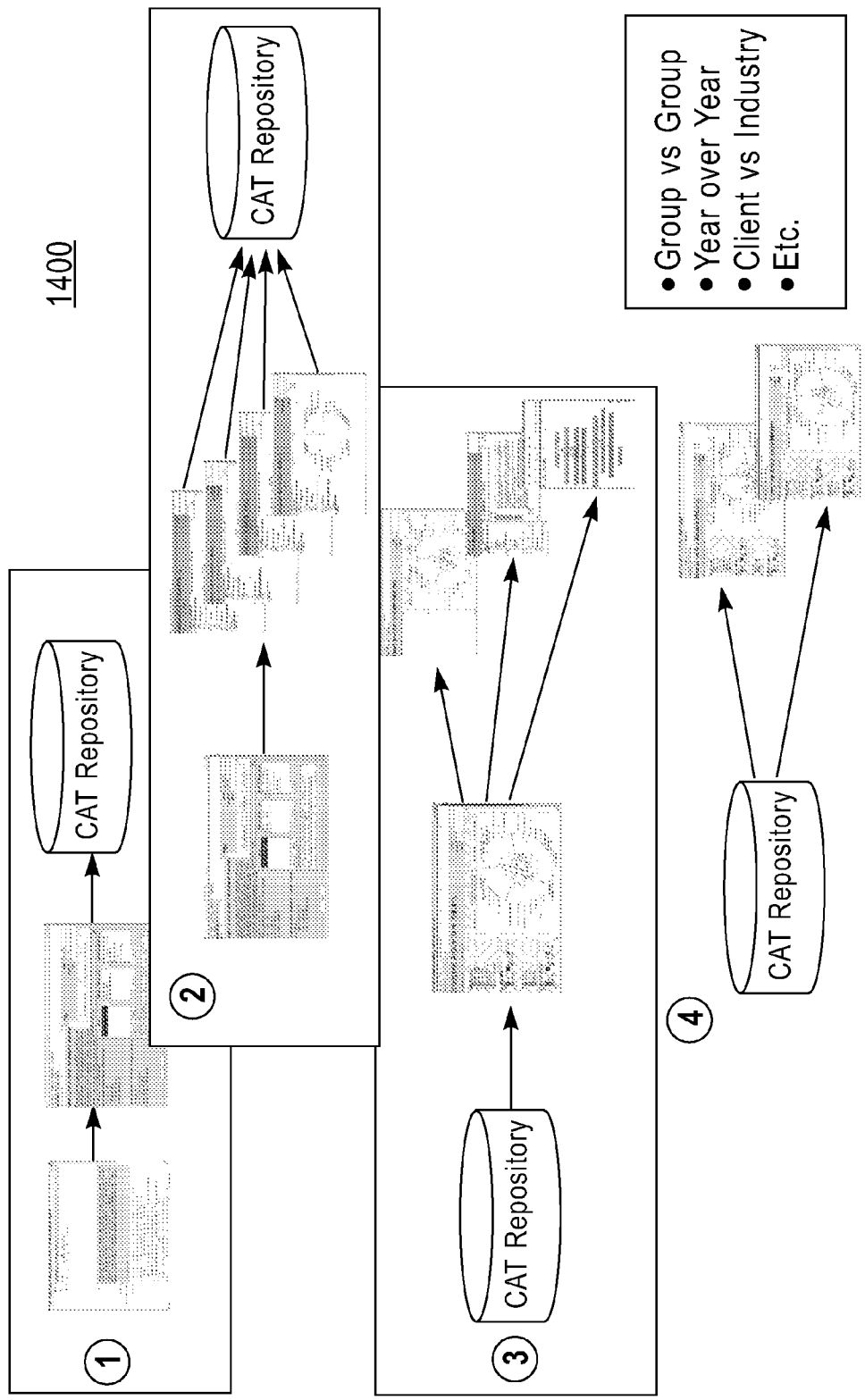
FIG. 14 illustrates an exemplary workflow 1400 for a capability assessment tool (CAT) for implementing the method 100, according to an exemplary aspect of the present invention.

FIG. 14 illustrates an exemplary workflow 1400 for the capability Assessment Tool (CAT) for implementing the method 100 according to an exemplary aspect of the present invention.

As illustrated in FIG. 14, in the workflow 1400, a subject matter expert may author their maturity model with a CAT questionnaire builder and upload the model into the CAT repository using a CAT administration tool. Second, with the questionnaire ready, engagements can then be set up with the CAT administration tool indicating individual client respondents. The respondents can then log in using the CAT web survey tool, fill out surveys and save their responses back to the repository.

Third, with all of the client responses stored in the database, the engagement lead can then use the CAT analysis tool to load the collective set of client results, analyze the data, and export diagrams and data to an MS Office format for deliverable creation.

Fourth, since all the data gets stored in the single repository, the results from a given engagement can be used again, either as a time sequence when the assessment is performed again at that client, or as part of a benchmarking exercise, etc.

With its unique and novel features, the present invention provides a method and system for analyzing capabilities which may detect whether a capability pattern exists based on the entity's capabilities. This may help to allow the present invention generate a helpful customized action plan for solving problems that may be experienced by the entity.

While the invention has been described in terms of one or more exemplary embodiments, those skilled in the art will recognize that the invention can be practiced with modification within the spirit and scope of the appended claims. For example, while the exemplary capability model 210 in FIG. 3 may be depicted as a capability model for an Enterprise Architecture Maturity assessment, the basic structure of the capability model 210 may be applied to other topical areas.

Further, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of analyzing plural capabilities of an entity, comprising:
    inputting data regarding the plural capabilities of an entity; and
    using a capability model to detect a capability pattern among said plural capabilities, and identify a symptom associated with the capability pattern, the capability model grouping the plural capabilities into plural domains, and plural functional areas which span the plural domains and include a group of related capabilities of the plural capabilities; and
    generating an action plan based on said capability pattern and the symptom, the action plan identifying a functional area of the plural functional areas to be addressed to resolve the symptom,
    wherein for a capability of the plural capabilities, the capability model includes a description of the capability, plural maturity values which are independently defined for the capability, and plural descriptions associated with the plural maturity values,
    wherein the capability pattern comprises a rule indicating a relationship between the plural capabilities of the entity, and
    wherein the using of the capability model comprises generating a capability profile for the entity, the capability profile comprising a graphical representation of the maturity values of the plural capabilities of the entity, and using the capability profile to detect the capability pattern.

2. The method of claim 1, wherein said capability pattern is associated with a plurality of said capabilities.

3. The method of claim 2, wherein said capability model groups said plural capabilities into plural functional areas which include a nonexclusive grouping of said plural capabilities, and plural domains which include an exclusive grouping of said plural capabilities.

4. The method of claim 3, wherein said plural functional areas include nested hierarchies of functional areas.

5. The method of claim 1, wherein said capability pattern includes a plurality of capability patterns.

6. The method of claim 5, further comprising:
    identifying a combination of capability patterns in said plurality of a capability patterns; and
    associating with said combination an other symptom that is typical of said combination.

7. The method of claim 6, wherein said capability model comprises an action plan generator for generating said action plan, and said action plan is for resolving said other symptom and includes:
    a description of said other symptom; and
    an ordered set of said functional areas to be addressed for resolving said other symptom.

8. The method of claim 7, wherein an order of said ordered set of functional areas is based on a dependency between said functional areas.

9. The method of claim 7, further comprising:
    using a result of applying said action plan to said capability model to generate a new action plan.

10. The method of claim 7, wherein said other symptom includes a plurality of symptoms.

11. The method of claim 10, further comprising:
    prioritizing said plurality of symptoms.

12. The method of claim 7, wherein said other symptom is associated with a combination of capability patterns having a high correlation with known effects.

13. The method of claim 1, wherein said capability pattern includes:
    a rule which indicates how to detect when said capability pattern exists.

14. The method of claim 13, wherein the rule of said capability pattern is expressed in terms of a value of a single capability, in terms of an existence of a capability pattern, or in terms of an existence of a capability pattern and an absence of a capability pattern.

15. The method of claim 13, wherein the rule of said capability pattern is expressed in terms of a relationship between values of said plural capabilities, a relationship between a value of a capability and an existence of a capability pattern, or a relationship between a value of a capability and an absence of a capability pattern.

16. The method of claim 13, wherein said symptom describes an expected behavior resulting from said capability pattern.

17. The method of claim 16, wherein said action plan includes a prescription which describes a suggested action to overcome said symptom.

18. The method of claim 1, further comprising:
    for the detected capability pattern, identifying a symptom associated with the capability pattern, determining driving capabilities which are involved in the capability pattern, predicting problems which are likely to be present when the capability pattern exists, prescribing a resolution for solving the predicted problems, and generating a rule which describes a relationship between the driving capabilities that determines an existence and a severity of the capability pattern.

19. The method of claim 1, wherein the action plan includes a schedule of actions and changes, the schedule being based on priorities of the entity.

20. The method of claim 1, wherein plural maturity values comprise a numerical value which is associated with a maturity value of the plural maturity values.

21. The method of claim 1, wherein the capability pattern comprises a rule indicating a relationship between a maturity level of a first capability of the plural capabilities and a maturity level of a second capability of the plural capabilities.

22. The method of claim 1, further comprising:
    arbitrarily identifying a group of capabilities in the plural capabilities which define a meta-capability.

23. The method of claim 1, further comprising:
storing historical data of behavior of the entity,
wherein the generating of the action plan comprises using the stored historical data to predict a behavior of the entity.

24. The method of claim 1, further comprising:
generating a display screen which displays the capability profile for the entity and an other capability profile plotted on the same chart, for comparing the capability profile for the entity with the other capability profile.

25. The method of claim 1, wherein the inputting of data comprises generating plural questions by the capability model, and inputting plural responses to the plural questions by a user, and
wherein the generating of the capability profile comprises processing the plural responses to generate the capability profile.

26. The method of claim 25, wherein the generating of the action plan comprises comparing the plural responses with a set of predefined analysis artifacts.

27. The method of claim 1, generating an individual capability maturity level screen which includes an input area for allowing a user to input a maturity level,
wherein the inputting of data comprises inputting the maturity level in the input area by the user.

28. The method of claim 1, generating a pattern editor screen which includes an input area for allowing a user to edit a description of a capability pattern, a predicted behavior associated with the capability pattern and a prescribed solution for the capability pattern; and
generating a rule editor screen which includes an input area for allowing a user to edit a rule indicating a relationship between capabilities of the plurality capabilities.

29. The method of claim 1, wherein the generating of the action plan comprises generating a display screen for displaying a capability profile including indicia for indicating a suggested course of action.

30. The method of claim 1, further comprising:
generating a graphical representation of maturity model based on the maturity levels for the plurality of capabilities of the entity.

31. A system for analyzing plural capabilities, comprising:
an input device for inputting data regarding the plural capabilities of an entity; and
a capability model for detecting a capability pattern among said plural capabilities, and identifying a symptom associated with the capability pattern, the capability model grouping the plural capabilities into plural domains, and plural functional areas which span the plural domains and include a group of related capabilities of the plural capabilities; and
an action plan generator for generating an action plan based on said capability pattern and the symptom, the action plan identifying a functional area of the plural functional areas to be addressed to resolve the symptom,
wherein for a capability of the plural capabilities, the capability model includes a description of the capability, plural maturity values which are independently defined for the capability, and plural descriptions associated with the plural maturity values,
wherein the capability pattern comprises a rule indicating a relationship between the plural capabilities of the entity, and
wherein the capability model comprises a capability profile for the entity, the capability profile comprising a graphical representation of the maturity values of the plural capabilities of the entity, and the capability model uses the capability profile is to detect the capability pattern.

32. A non-transitory programmable storage medium tangibly embodying a program of machine-readable instructions executable by a digital processing apparatus to perform a method of analyzing plural capabilities of an entity, said method comprising:
inputting data regarding the plural capabilities of an entity; and
using a capability model to detect a capability pattern among said plural capabilities, and identify a symptom associated with the capability pattern, the capability model grouping the plural capabilities into plural domains, and plural functional areas which span the plural domains and include a group of related capabilities of the plural capabilities; and
generating an action plan based on said capability pattern and the symptom, the action plan identifying a functional area of the plural functional areas to be addressed to resolve the symptom,
wherein for a capability of the plural capabilities, the capability model includes a description of the capability, plural maturity values which are independently defined for the capability, and plural descriptions associated with the plural maturity values, and
wherein the capability pattern comprises a rule indicating a relationship between the plural capabilities of the entity, and
wherein the using of the capability model comprises generating a capability profile for the entity, the capability profile comprising a graphical representation of the maturity values of the plural capabilities of the entity, and using the capability profile to detect the capability pattern.

* * * * *